US005424701A

United States Patent [19]

Castonguay et al.

[11] Patent Number: 5,424,701

[45] Date of Patent: Jun. 13, 1995

[54] OPERATING MECHANISM FOR HIGH AMPERE-RATED CIRCUIT BREAKERS

[75] Inventors: Roger N. Castonguay, Terryville; James L. Rosen, West Hartford; Mark A. Zaffetti, Windsor Locks, all of Conn.

[73] Assignee: General Electric, New York, N.Y.

[21] Appl. No.: 202,140

[22] Filed: Feb. 25, 1994

[51] Int. Cl.[6] .............................................. H01M 9/00

[52] U.S. Cl. ..................................... 335/172; 200/400

[58] Field of Search ................................ 335/167-176; 200/400

[56] References Cited

U.S. PATENT DOCUMENTS

| | | | |
|---|---|---|---|
| 2,581,181 | 1/1952 | Favre . | |
| 4,001,742 | 1/1977 | Jencks et al. . | |
| 4,801,907 | 1/1989 | Kelaita, Jr. et al. . | |
| 4,821,008 | 4/1989 | Micoud et al. | 335/184 |
| 4,845,324 | 7/1989 | Martin et al. | 200/400 |

*Primary Examiner*—Lincoln Donovan
*Attorney, Agent, or Firm*—Richard A. Menelly

[57] ABSTRACT

An operating mechanism is disclosed which is capable of meeting electrical code requirements in the world market. The operating springs controlling the OPEN and CLOSED states of the circuit breaker contacts are charged both before and after the contacts are in their CLOSED conditions. The mechanism is both latched and unlatched by operation of a rotating cradle operator.

13 Claims, 6 Drawing Sheets

OPERATING MECHANISM FOR HIGH AMPERE-RATED CIRCUIT BREAKERS

BACKGROUND OF THE INVENTION

U.S. Pat. No. 4,001,742 entitled "Circuit Breaker Having Improved Operating Mechanism" describes a circuit breaker capable of interrupting several thousand amperes of circuit current at several hundred volts potential. As described therein, the operating mechanism is in the form of a pair of powerful operating springs that are restrained from separating the circuit breaker contacts by means of a latching system. Once the operating mechanism has responded to separate the contacts, the operating springs must be recharged to supply sufficient motive force to the movable contact arms that carry the contacts. With the arrangement described within the aforementioned U.S. Patent, the operating springs can only be charged when the circuit breaker contacts are in the OPEN condition. It would be advantageous to be able to immediately reset the circuit breaker operating mechanism to reclose the contacts without having to recharge the circuit breaker operating springs immediately after opening the circuit breaker contacts.

One purpose of the invention, accordingly, is to provide a circuit breaker operating mechanism that is capable of recharging the circuit breaker operating springs with the circuit breaker contacts in both their OPEN as well as CLOSED conditions.

SUMMARY OF THE INVENTION

A circuit breaker operating mechanism interacts with the circuit breaker movable contact arms by means of an interface cam that controls the resultant forces provided by opposing opening and closing springs. The interface cam further interacts with an operating shaft by means of an opening lever in such a manner that when the cam is in one position the opening springs can drive the contact arms and the associated contacts to their OPEN conditions. When the cam is in another position the closing springs can motivate the contact arms and associated contacts to their CLOSED conditions.

DESCRIPTION OF THE PREFERRED EMBODIMENT

Figure 1:
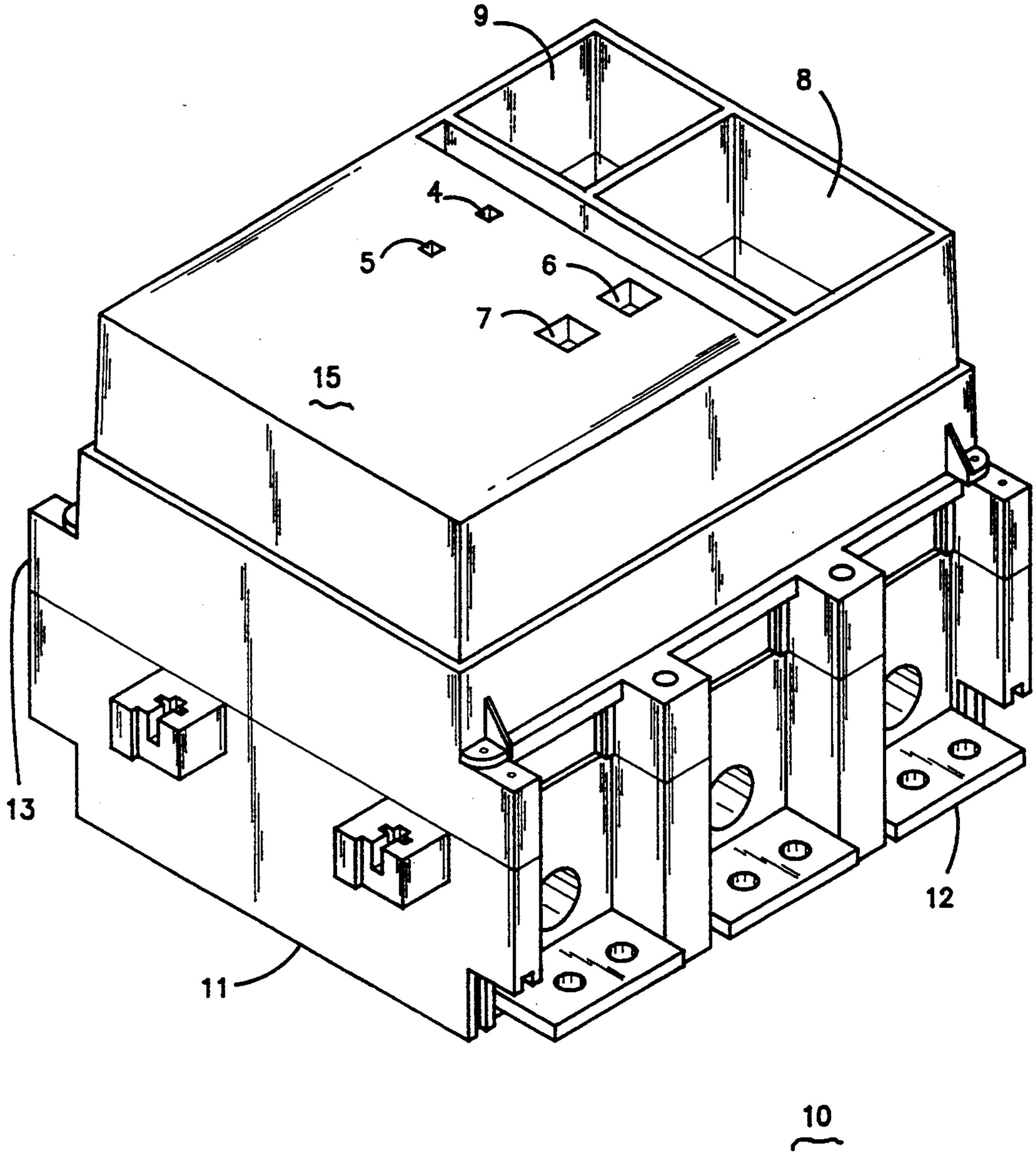
FIG. 1 is a top perspective view of a circuit breaker employing the operating mechanism according to the invention.
Figure 2:
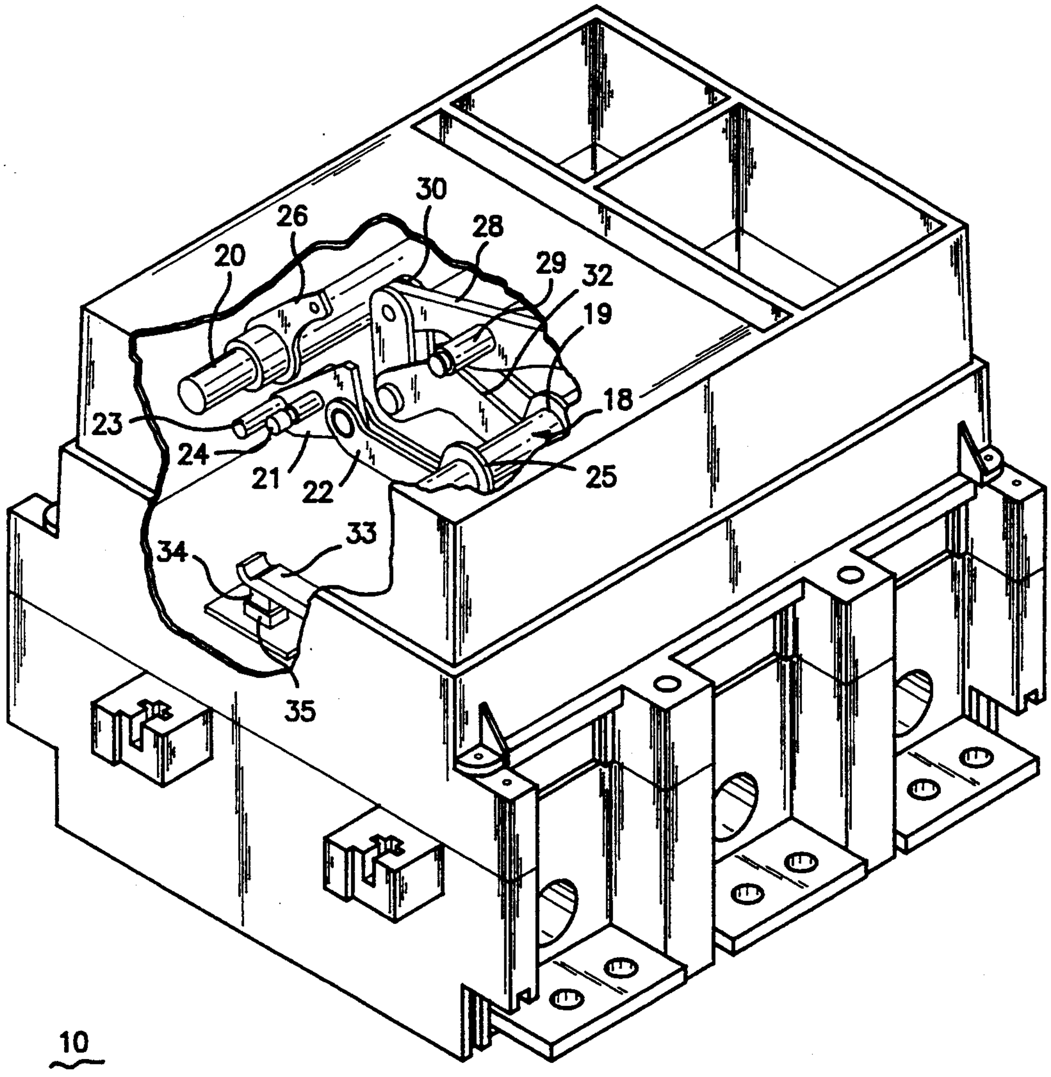
FIG. 2 is a top perspective view of the circuit breaker of FIG. 1 with a portion of the cover removed to depict the circuit breaker operating mechanism.

The high ampere-rated circuit breaker 10 shown in FIG. 1 is capable of transferring several thousand amperes quiescent circuit current at several hundred volts potential without overheating. The circuit breaker consists of an electrically insulated base 11 to which an intermediate cover 13 of similar insulative material is attached prior to attaching the top cover 15, also consisting of an electrically-insulative material. Electrical connection with the interior current-carrying components is made by load terminal straps 12 extending from one side of the base and line terminal straps (not shown) extending from the opposite side thereof. The interior components are controlled by an electronic trip unit contained within a recess 8 on the top surface of the top cover 15. Although not shown herein, the trip unit is similar to that described within U.S. Pat. No. 2,581,181 and interacts further with an accessory contained within the accessory recess 9 to provide a range of protection and control functions such as described, for example within U.S. Pat. No. 4,801,907. ON and OFF buttons 6,7 and ON and OFF indicators 4,5, accessible from the top cover allow manual operation of the circuit breaker operating mechanism 18 to separate the circuit breaker movable and fixed contacts 34, 35 as best seen by now referring to operating mechanism 18 within the circuit breaker 10 shown in FIG. 2.

Figure 3:
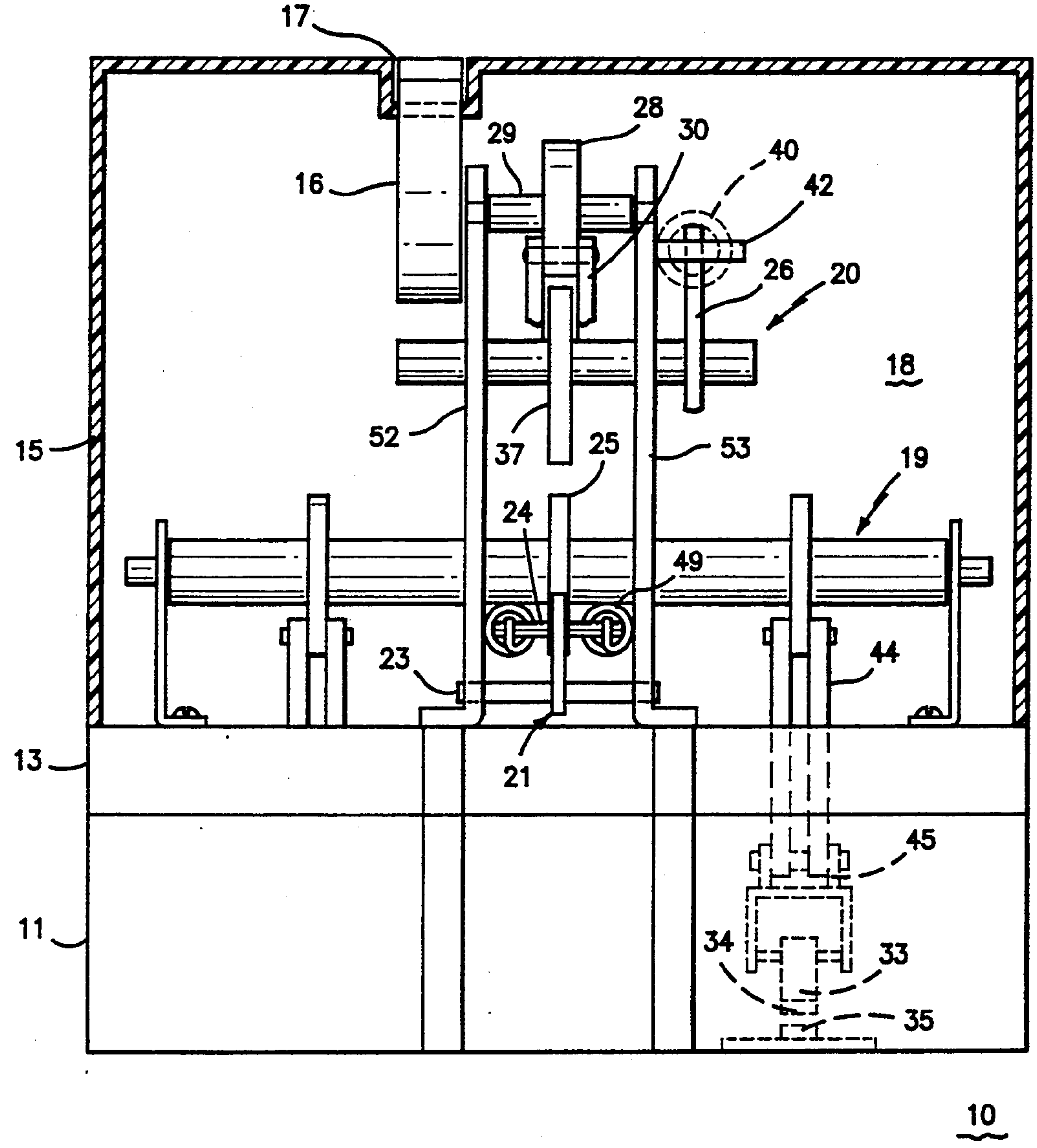
FIG. 3 is an end view of the circuit breaker of FIG. 2 with part of the cover removed to show the positional relationship of the operating mechanism components.

The closing shaft 20 is depicted relative to the drive shaft 19 with the various drive and closing springs removed for purposes of clarity and to depict the positional relationship between the two shafts as they interact to control the position of the movable contact arm 33 and the moveable contact 34. The cradle 28 rotates about the cradle pivot 29 and interacts with both the drive shaft and the closing shafts by means of the cradle link 30 and the drive shaft link 32. As described below in greater detail, the drive shaft 19 connects with the opening link 22 by attachment to the crank 25 at one end and to the interface cam 21 at the opposite end. The pins 23, 24 on the interface cam serve as a pivot pin and as a spring support pin. The crank 26 on the closing shaft 20 allows for the attachment of a closing spring 40, between the crank and the post 42 as shown in the operating mechanism 18 within the circuit breaker 10 depicted in FIG. 3.

The operating handle 16 extends within the recess 17 along one of the sideframes 52, 53 and interacts with the closing shaft 20 which extends between the sideframes. The cradle 28 is supported on the cradle pivot 29 and interconnects with the closing cam 37 on the closing shaft 20 by means of the cradle links 30. The crank 26 extending from the closing shaft 20 supports the powerful closing spring 40 to rotate the drive shaft 19 and move the contact arm drive link 44, contact arm carrier 45 and contact arm 33 into the CLOSED condition with the movable contact 34 in abutment with the fixed contact 35. The interface cam 21 includes the spring support pin 24 that positions and supports a pair of opening springs 49 to rotate the interface cam 21 about the pivot pin 23 to rotate the drive shaft 19 and lift the contact arm drive link 44, contact arm carrier 45 and contact arm 33 to drive the moveable contact 34 away from the fixed contact 10 35. Although only one pair of moveable and fixed contacts are depicted, there is a similar pair of such contacts for each circuit breaker pole contained within the circuit breaker case 11. The contacts and other current-carrying components are contained within the circuit breaker case and are insulated from the operating mechanism components within the top cover 15 by means of the electrically-insulating intermediate cover 13.

Figure 4:
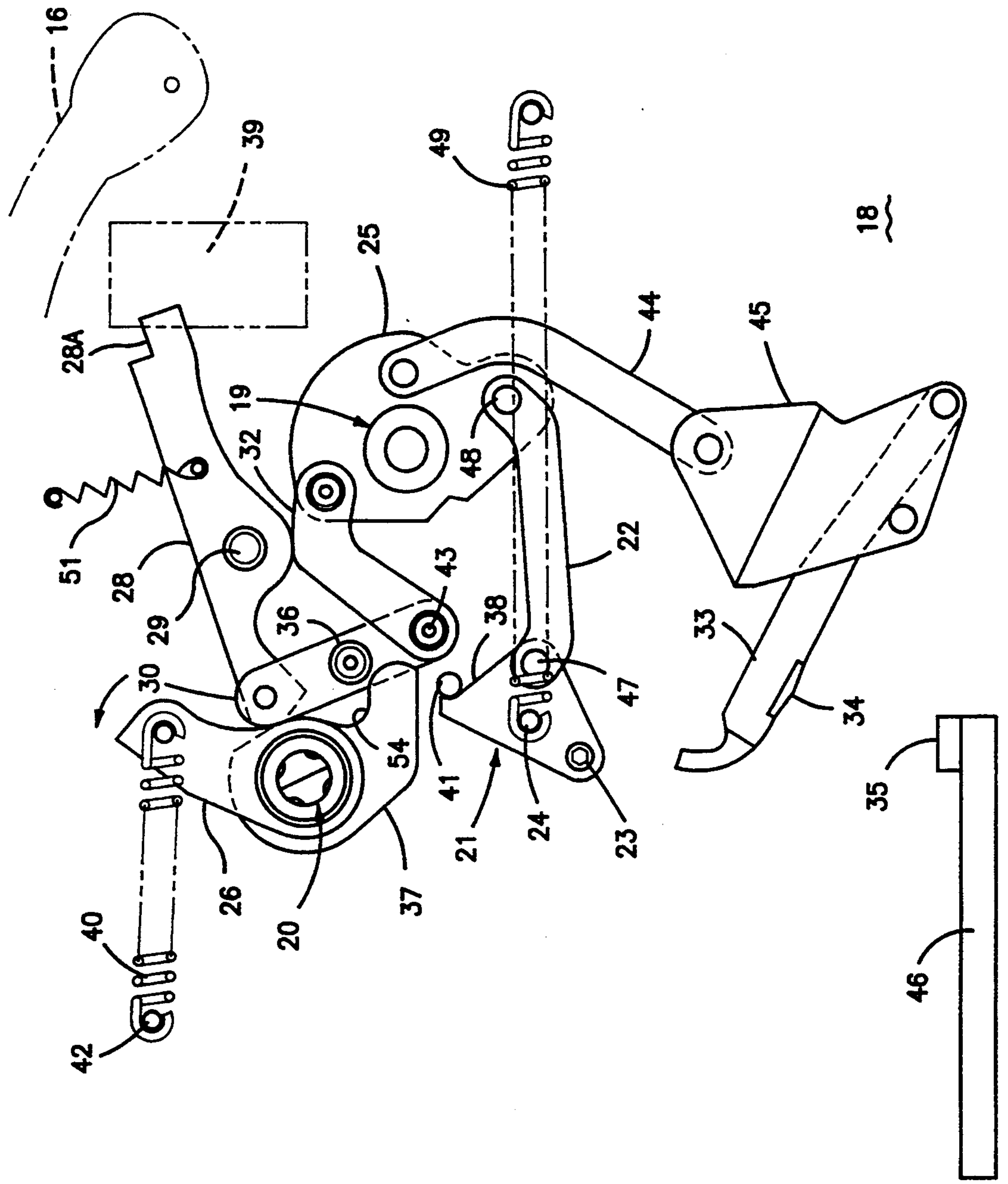
FIG. 4 is a side plan view of the operating mechanism of FIG. 2 with the circuit breaker contacts in the OPEN and LATCHED condition.

The fixed contact 35 on the contact support 46 and the moveable contact 34 on the moveable contact arm 33 are in their OPEN condition as shown in FIG. 4. The operating handle 16 and latch assembly 39, both depicted in phantom, interact with the cradle 28 such that the cradle end 28A is retained by the latch assembly keeping the cradle from rotation about the cradle pivot 29 when the closing spring 40 is fully extended. The camming surface 54 on the closing cam 37 carried by the closing shaft 20 is away from the closing roller 36 carried by the cradle link 30. The drive shaft 19 which connects with the contact arm carrier 45 by means of the contact arm drive link 44 and crank 25 on the drive shaft and with the cradle link 30 by means of the drive shaft link 32 and connecting pin 43 moves the contact arm carrier and attached contact arm 33 between its OPEN and CLOSED positions. In accordance with the invention, the interface cam 21 supported by means of the pivot pin 23 interacts with the drive shaft 19 by means of the opening link 22 which is connected to the interface cam and the crank 25 on the drive shaft 19 by means of the pins 47,48 to accurately control the operation of the crankshaft. With the cradle held in position by the cradle return spring 51 and latch assembly 39, and with the interface cam 21 held in the position depicted in FIG. 4 by means of the engagement of the end of the camming surface 38 on the interface cam 21 with the stop pin 41. In this position, the opening spring 49 extending from the pin 24 on the interface cam 21 restrains the drive shaft 19 from rotation under the urgence of the powerful closing spring 40 and thereby maintains the moveable contact arm 33 in the OPEN position.

Figure 5:
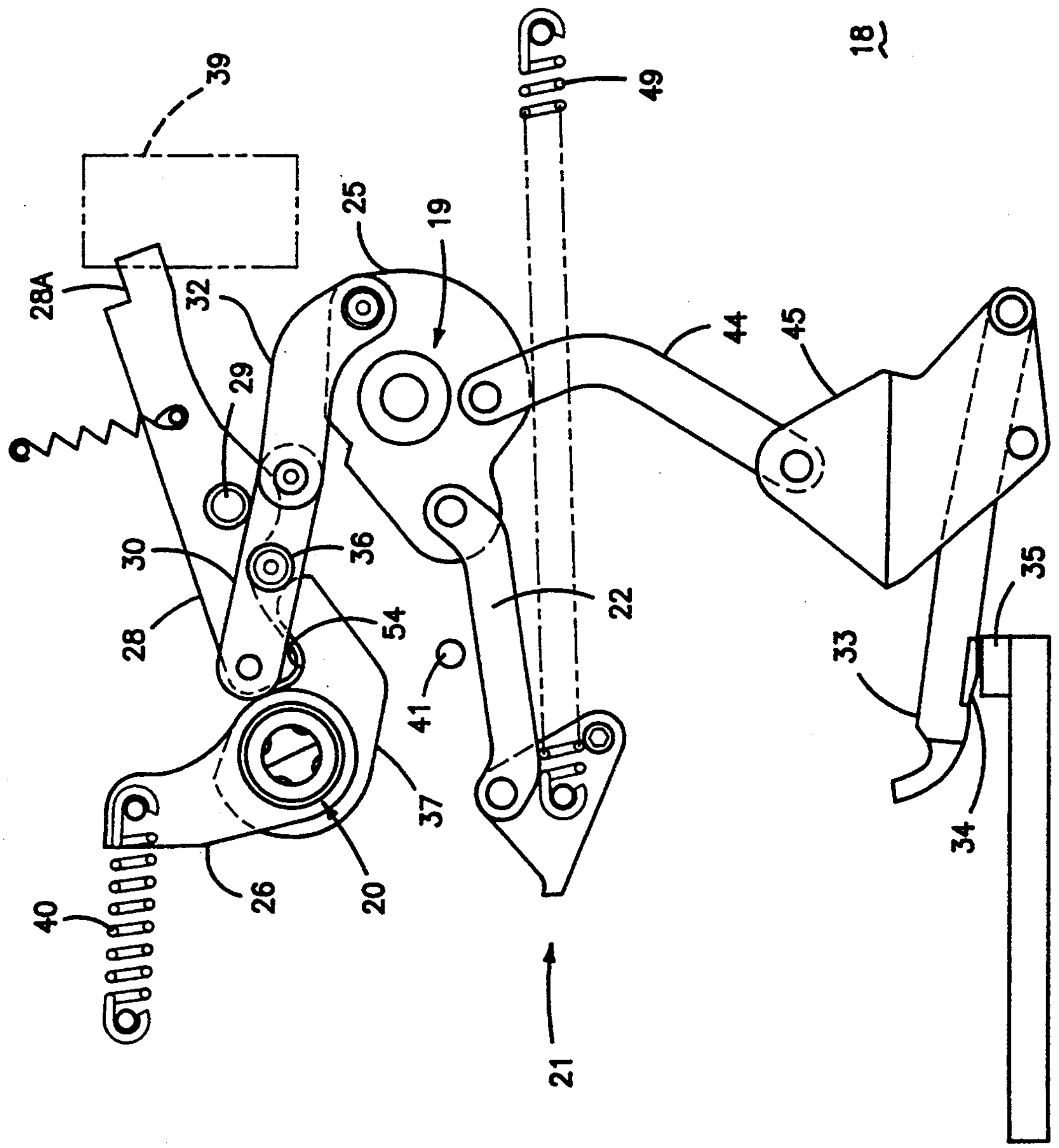
FIG. 5 is a side plan view of the operating mechanism of FIG. 2 with the circuit breaker contacts in the CLOSED condition.

When it is desired to move the moveable contact 34 to the CLOSED position, the interface cam 21 is displaced away from the stop pin 41 as shown in the operating mechanism 18 in FIG. 5 which allows the drive shaft 19 connected with the opening link 22 and the crank 25 to rotate in the counter clockwise direction driving the drive link 44 and attached contact carrier 45 in the downward direction forcing the moveable contact arm 33 and attached moveable contact 34 into abutment with the fixed contact 35. The cradle end 28A of the cradle 28 remains under the latch system 39 when the closing shaft 20 is rotated in the counter clockwise direction under the bias of the closing spring 40 whereby the camming surface 54 of the closing cam 37 strikes the closing roller 36 driving the charge link 30 and attached drive shaft link 32 upwards against the cradle pivot pin 29 which halts the upwards motion and positions the charge link and the shaft link in a straight line. In this position, the closing spring can be recharged by rotating the closing shaft 20 crank 26 in the clockwise direction to charge the closing spring as indicated in phantom, without disturbing the arrangement of the cradle end 28A or the moveable contact arm 33.

Figure 6:
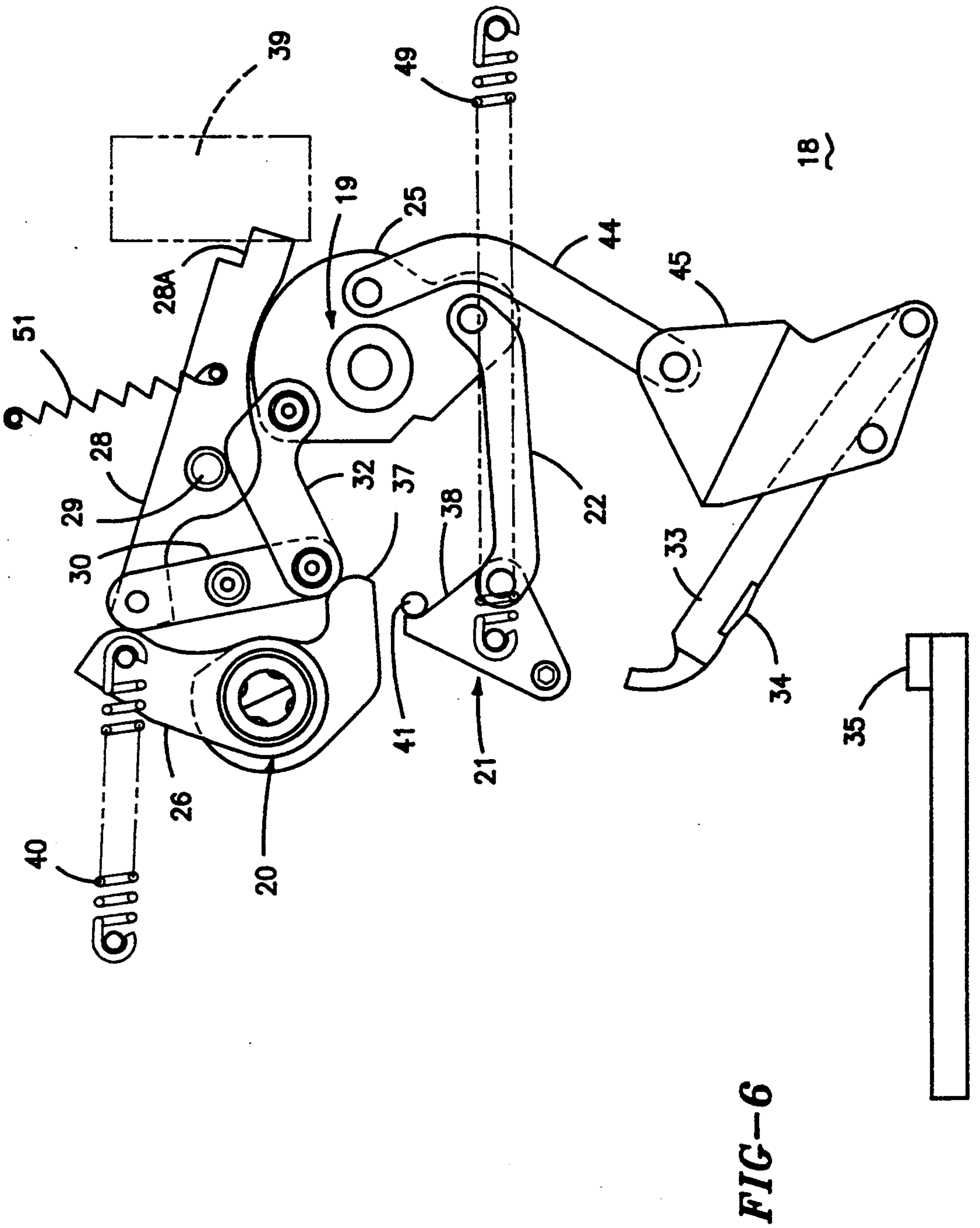
FIG. 6 is a side plan view of the operating mechanism of FIG. 2 with the circuit breaker contacts in the TRIPPED or UNLATCHED condition.

The articulation of the circuit breaker operating mechanism upon the occurrence of an overcurrent condition through the associated protected electrical distribution system is best understood by referring now to the operating mechanisms depicted in FIGS. 5 and 6. The latch assembly 39 releases the cradle end 28A from the latched position in FIG. 5 to the unlatched condition in FIG. 6 allowing the opening spring 49 to rotate the crank 25 and drive shaft 19 in the counter-clockwise direction pulling the contact arm drive link 44 upwards along with the contact arm carrier 45 and contact arm 33. The moveable contact 34 attached to the contact arm 33 becomes separated from the fixed contact 35 to interrupt the circuit current. The interface cam 21 has rotated clockwise until the end of the camming surface 38 contacts the stop post 41. The movable contact 34 is returned to the CLOSED condition by engaging the cradle end 28A within the latch assembly 39 and allowing the closing spring to rotate the closing shaft 20 counter-clockwise driving the closing cam 37 and the cradle link and drive shaft links, 30, 32 up against the cradle pivot pin 29. The crank 25 and drive shaft 19 rotate the interface link 21 clockwise moving the end of the camming surface 38 away from the stop post 41. The opening spring 49 becomes extended thereby motivating the contact carrier 45 and contact arm 33 downwards to the CLOSED condition shown in FIG. 4.

A circuit breaker operating mechanism has herein been disclosed having high current-handling capacity and being capable of having the operating springs charged when the contacts are closed for rapidly reclosing the contacts after an overcurrent circuit interruption.

We claim:

1. An industrial-rated circuit breaker for high level overcurrent protection comprising:
- an insulative base 11;
- a pair of separable contacts 34,35 within said base, one of said contacts 34 being attached to a movable contact arm 33;
- a contact arm carrier 45 connecting with said movable contact arm within said base and with a contact arm drive link 44 extending outside said base;
- an insulative cover 15 above said base, said cover enclosing a closing shaft 20 and a drive shaft 19, said drive shaft connecting with said contact arm drive link for moving said contact arm carrier and said contact arm between closed and open positions; and
- an interface cam 21 interacting with said drive shaft for controlling when said drive link moves said contact arm between said open and closed positions.

2. The industrial-rated circuit breaker of claim 1 including a cradle 28, one end of said cradle connecting with said drive shaft by means of a cradle link 30 and a drive shaft link 32, another end of said cradle interacting with a latch assembly 39 whereby said latch assembly retains said cradle other end under quiescent current conditions through said contacts and releases said cradle other end upon occurrence of an overcurrent condition through said contacts.

3. The industrial-rated circuit breaker of claim 1 including a cradle pivot pin 29 rotatably supporting said cradle within said cover, said cradle pivot pin providing a stop to said drive shaft link during said overcurrent condition.

4. The industrial-rated circuit breaker of claim 1 including a closing spring 40 connecting with said closing shaft for rotating said closing shaft in a first direction.

5. The industrial-rated circuit breaker of claim 1 including an opening spring 49 connecting with said interface cam for rotating said drive shaft in a second direction opposite to said first direction.

6. The industrial-rated circuit breaker of claim 1 wherein said interface cam is rotatably mounted within said cover by means of a pivot pin 23 at one end and includes a camming surface 38 formed on an opposite end, said camming surface interacting with a stop post 41 to limit rotation of said interface cam in said second direction.

7. The industrial-rated circuit breaker of claim 1 wherein said closing shaft carries a closing cam 37, said closing cam defining a camming surface 54 and said cradle link includes a closing roller 36, said closing cam camming surface interacting with said closing roller when said drive shaft rotates in said second direction to move said contact arm drive link in a downward direction.

8. An industrial-rated circuit breaker for high level overcurrent protection comprising:

an insulative base 11;

a pair of separable contacts 34,35 within said base, one of said contacts 34 being attached to a movable contact arm 33;

a contact arm carrier 45 connecting with said movable contact arm within said base and with a contact arm drive link 44 extending outside said base;

an insulative cover 15 above said base, said cover enclosing a drive shaft 19, said drive shaft connecting with said contact arm drive link for moving said contact arm carrier and said contact arm between open and closed positions; and an interface cam 21 interacting with said drive shaft for controlling when said drive link moves said contact arm between said open and closed positions.

9. The industrial-rated circuit breaker of claim 8 including a cradle 28, one end of said cradle connecting with said drive shaft by means of a cradle link 30 and a drive shaft link 32, another end of said cradle interacting with a latch assembly 39 whereby said latch assembly retains said cradle other end under quiescent current conditions through said contacts and releases said cradle other end upon occurrence of an overcurrent condition through said contacts.

10. The industrial-rated circuit breaker of claim 8 including a closing shaft 20 biased in a first direction by a closing spring 40.

11. The industrial-rated circuit breaker of claim 8 including a pair of opposedly adjacent sideframes 52, 53 extending within said top, said cradle pivot and said closing shaft extending between and being supported by said sideframes.

12. The industrial-rated circuit breaker of claim 8 wherein said closing shaft is attached to said closing link by removable fastener means.

13. The industrial-rated circuit breaker of claim 8 including an opening link 22 extending between said interface cam and said drive shaft.

* * * * *